T. D. WOOLSON, DEC'D.
S. E. MARSCH, ADMINISTRATRIX.
ASH PAN.
APPLICATION FILED JUNE 5, 1918. RENEWED DEC. 7. 1920.

1,365,435.

Patented Jan. 11, 1921.
2 SHEETS—SHEET 1.

Thomas D Woolson
Inventor

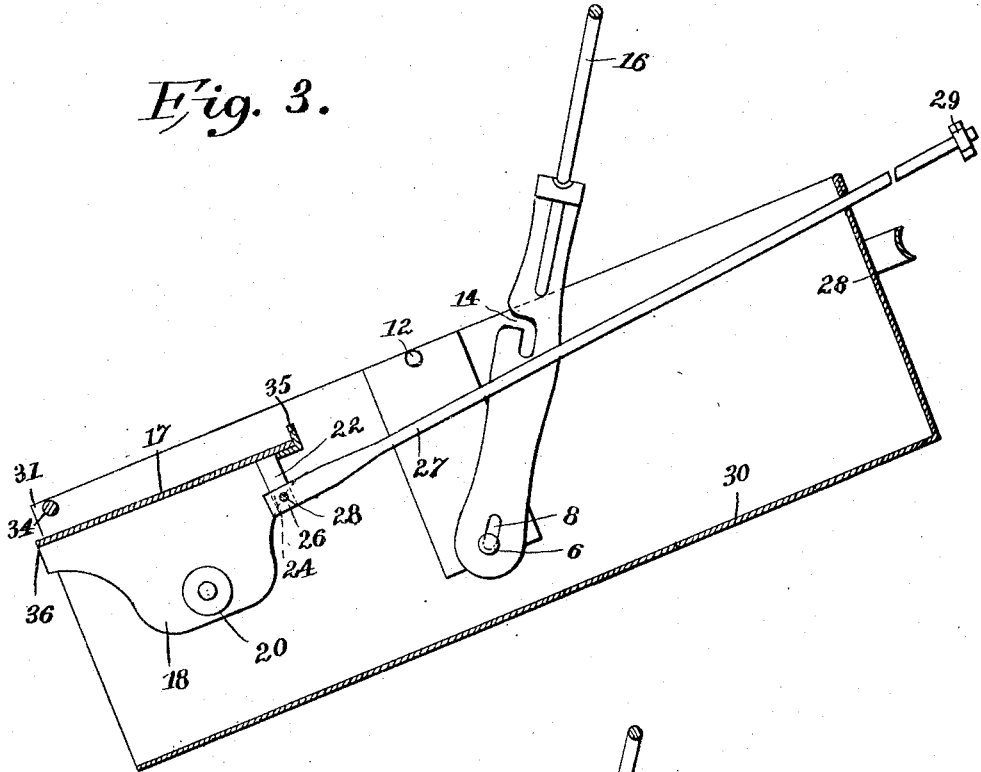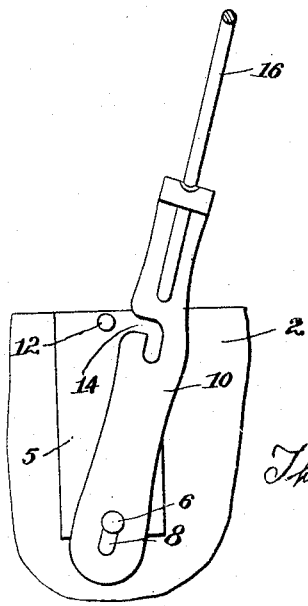

UNITED STATES PATENT OFFICE.

THOMAS D. WOOLSON, OF RICHMOND, VIRGINIA; STELLA E. MARSCH ADMINISTRATRIX OF SAID THOMAS D. WOOLSON, DECEASED.

ASH-PAN.

1,365,435.   Specification of Letters Patent.   Patented Jan. 11, 1921.

Application filed June 5, 1918, Serial No. 238,304. Renewed December 7, 1920. Serial No. 429,033.

*To all whom it may concern:*

Be it known that I, THOMAS D. WOOLSON, a citizen of the United States, residing at Richmond, in the county of Henrico and State of Virginia, have invented certain new and useful Improvements in Ash-Pans, of which the following is a specification.

This invention relates to improvements in ashpans, and has for its object to provide an ashpan having a pivoted bail and means whereby the bail automatically becomes rigid relative to the pan when the bail is used to lift the pan.

Another object of the invention is to provide an ashpan with a pivoted bail, said bail having a vertical sliding movement relative to the pan whereby the bail may be rigidly secured relative to the pan.

Another object of the invention is to provide an ashpan having a rotatably mounted end wall.

Still another object of the invention is to provide an ashpan having a movable end wall and means whereby said wall may be automatically raised by the tilting of the pan.

And still another object of the invention is to provide an ashpan having an end wall, the position of which may be changed in order to form a funnel mouth for the pan.

With the above and other objects in view, I have invented the device illustrated in the accompanying drawings in which:

Fig. 3 is a similar view of my device shown in another position.

Fig. 4 is a detailed elevational view of the bail supporting member.

Figure 1:
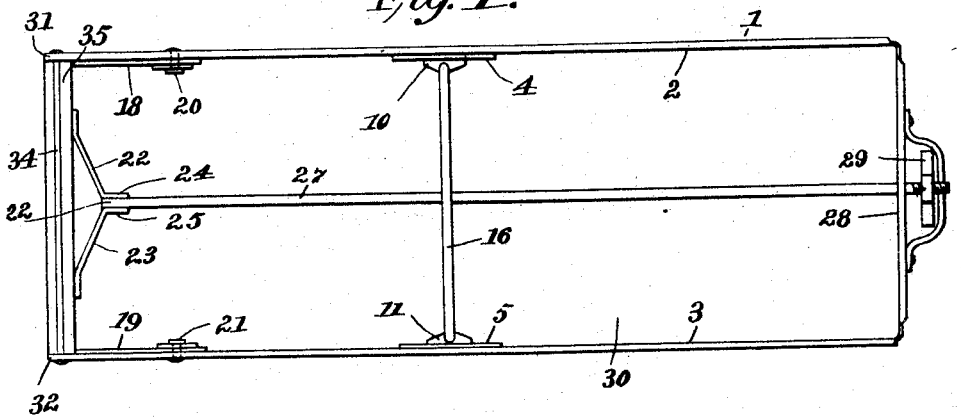
Figure 1 is a top plan view of my improved ashpan shown in its normal position.
Figure 2:
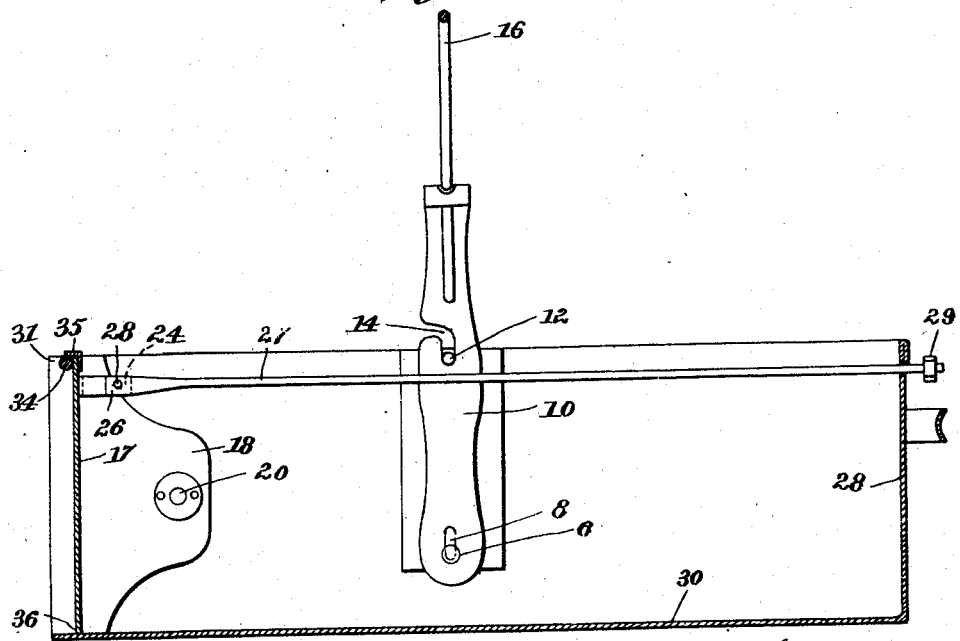
Fig. 2 is a longitudinal sectional view thereof.

Like reference characters indicate like parts throughout the following specification and in the several views of the drawings in which 1 indicates my improved ashpan having sidewalls 2 and 3, and the inner surfaces of which are provided with opposing reinforcing plates 4 and 5 respectively. Secured to these plates by means of rivets 6 and operating through elongated openings 8 are bail-holding members 10 and 11. Said rivets 6 holding said members 10 and 11, pivotally secured to said plates 4 and 5 and slidably connected thereto through said slots 8. Secured to the upper ends of the plates 4 and 5 are inwardly projecting studs 12 which are adapted to be engaged by the hooks 14 formed of the members 10 and 11 when said members are raised vertically through the lifting of the bail 16 for the purpose of lifting the pan. When the bail 16 is caught hold of, when in its normal inclined position as shown in Fig. 1, and raised to a vertical position the hooks 14 and 15 engage the lugs automatically and hold the bail rigid relative to the pan as long as the pan is suspended from the bail. However, as soon as the bail is released it drops through gravity to its lower position, and may be pivotally operated whereby it will assume its normal inclined inoperative position. The end wall 17 has inwardly turned at right angles thereto ears 18 and 19 which are reduced at their innermost ends and pivoted to the rivets 20 and 21. Straps 22 and 23 are secured to the inner surface of the wall 17, adjacent to its upper end, and have right angular ends 24 and 25 which form spaced ears to receive the inner end of the rod 27 which is pivoted between said ears. The other end of the rod 27 passes through an opening in the front wall 28 of the pan, and has a handle 29 secured thereto which may be used for both operating the wall 17 and tilting the pan at one and the same time. When said rod 27 is drawn outward, wall 17 is caused to operate upon its pivots 20 and 21 whereby it is drawn to its uppermost position as shown in Fig. 3, whereby said wall 17 together with the said walls 2 and 3, and the bottom 30 of the pan, form a funnel mouth for the pan whereby the contents of the pan may be dropped into a bucket or other receptacle. The corners 31 and 32 of the sidewalls 2 and 3 are united by a rod 34 against which a bead 35 of the walls 17 rests when in its closed position and which also forms a stop for the lower edge 36 and the wall 17 when in its raised position in order to limit the forward movement of said wall or gate 17.

Having now described my invention, that which I claim to be new and desire to procure by Letters Patent is:

An ashpan comprising a receptacle open at its top, a separate end wall, inwardly extending ears carried at each end of the end wall for pivotal engagement with each of the side walls, means comprising a longitudinally slidable rod pivoted centrally of the separate end wall near the top thereof for moving said wall upon its pivots whereby the end wall may be swung within the pan upon its pivot and a transverse bar connecting the side walls and located in the path of the upper edge of the end wall to limit the outward movement of the latter.

In testimony whereof I affix my signature in the presence of two witnesses.

THOMAS D. WOOLSON.

Witnesses:
J. A. BARKER,
JAMES WHITTICOE.